(No Model.)
C. B. DAVIS.
APPARATUS FOR HERMETICALLY SEALING CANS.
No. 345,487. Patented July 13, 1886.
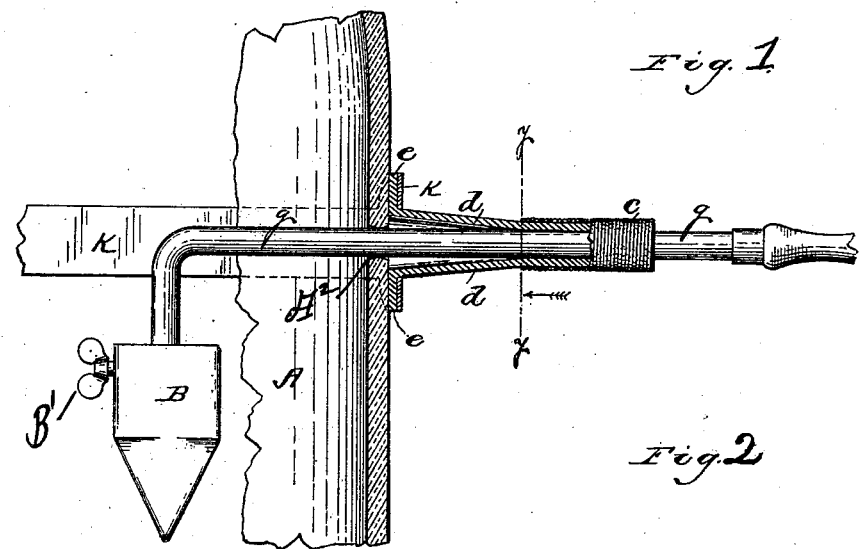
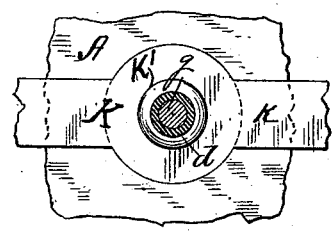
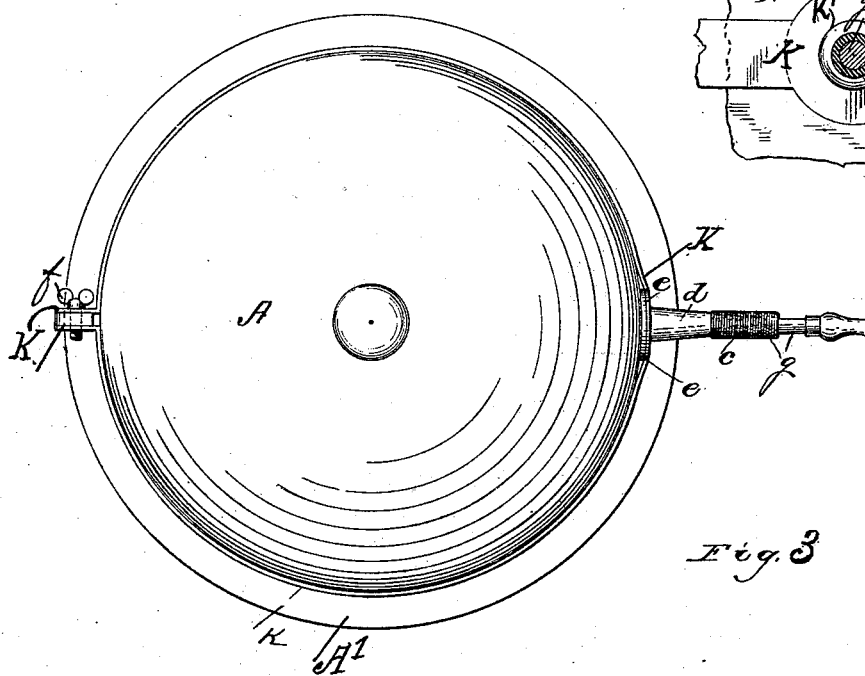
Witnesses.
Inventor.

UNITED STATES PATENT OFFICE.

CHYLER B. DAVIS, OF CHICAGO, ILLINOIS.

APPARATUS FOR HERMETICALLY SEALING CANS.

SPECIFICATION forming part of Letters Patent No. 345,487, dated July 13, 1886.

Application filed October 16, 1884. Serial No. 145,685. (No model.)

*To all whom it may concern:*

Be it known that I, CHYLER B. DAVIS, a citizen of the United States, residing in the city of Chicago, county of Cook, and State of Illinois, have invented certain new and useful Improvements in Mechanism for Hermetically Sealing Cans for the Preservation of Meats, Fruits, and Vegetables; and I do declare that the following is a full, clear, and exact description of the invention, which will enable others to make and use the same, reference being had to the accompanying drawings, in which—

Figure 1 is a section and side elevation of a portion of a hermetic can-sealing apparatus constructed in accordance with my invention. Fig. 2 is a vertical section on the line $y\,y$ of Fig. 1, and Fig. 3 is a plan.

Like letters of reference refer to like parts in all the figures.

The object of my invention is to provide a soldering-chamber and soldering implement for use in connection with that class of soldering-machines in which a can or cans are placed for the final sealing of the vent usually left in the top of the can when filled, and in which means are embodied for exhausting the air from the can receiving or soldering chamber at the time the said vent is sealed or closed.

My invention relates more particularly to the manner of connecting the soldering implement with the chamber, whereby ingress of air is prevented, while at the same time capability of moving the soldering-copper in all directions is secured.

A represents a glass chamber having a flange, A', at its lower edge, which flange may or may not be employed, as when used as hereinafter described air can be exhausted from the chamber without said flange. For purpose of connection between the chamber A and any can-receiver the flange may serve a good purpose. The chamber is apertured, as at $A^2$, the edges of the aperture being rounded to permit of an angular disposition therein of the handle of a soldering implement; but if desired the size of the aperture may be comparatively large with regard to the size of said handle, in which case, however, the exhaustion of air from the receiver might have a tendency to collapse the flexible connection hereinafter described, so that certain advantages are secured by confining the area of the aperture $A^2$ to about that of the handle of the soldering implement.

B represents the soldering-copper, which, by means of the thumb-screw B', is secured to the handle $g$, which is bent and passes through the aperture $A^2$ of the chamber A. Upon the handle G, by means of a cord or wire, $c$, is secured a rubber tube, $d$, which is flanged or spread, as at $e$, against the outer surface of the chamber and about the aperture $A^2$ thereof. A band, K, of metal or other material, is apertured, as at K', to receive the rubber tube $d$, and is of such width as to rest upon the flange $e$, and of such length as to pass around the chamber and to be connected at the ends by a clamping or tightening screw, $f$, whereby the band may be strained snugly to and around the chamber, and thus act to form an air-tight joint between the tube $d$ and the chamber.

It is apparent that when the chamber A is suitably connected with any can-receiver—for example, as shown in my applications Nos. 189,166 and 189,167, pending herewith—the air can be exhausted and a can or cans successively may be brought into proximity to the soldering-copper, when the same may be moved in any direction to reach the solder at the vent of said can or cans, so that the same may be melted to seal said vent or vents.

Having thus described my invention, what I claim is—

1. A soldering implement, in combination with an apertured chamber and a flexible tube secured to the implement and to the chamber and at and around the aperture therein, substantially as specified.

2. A soldering chamber having an aperture with rounded edges, and a soldering implement the handle of which is passed through said aperture and connected by means of a flexible tube to the outer surface of said chamber about said aperture, substantially as specified.

3. A glass soldering-chamber having an aperture through its wall, a soldering-implement handle passed through said aperture, a rubber tube secured at one end of said handle inclosing the same and spread or flanged upon said wall about said aperture, and a band embracing said chamber and tube-flange, and means for retaining said band in position, substantially as specified.

3. The combination of the chamber A, handle g, flexible tube d, having flange e, cord or wire c, band K, and screw f, substantially as specified.

5. The combination of the glass chamber A, having flange A' and aperture A², with rounded edges, the handle g, bearing on said edges, the copper B, the flexible flanged tube d, cord or wire c, the band K, and screw f, substantially as specified.

CHYLER B. DAVIS.

Witnesses:
SAMUEL M. BOOTH,
A. C. OVERALL.